United States Patent
Fuchs et al.

(10) Patent No.: US 10,375,394 B2
(45) Date of Patent: Aug. 6, 2019

(54) SOURCE CODING SCHEME USING ENTROPY CODING TO CODE A QUANTIZED SIGNAL ON A DETERMINED NUMBER OF BITS

(71) Applicant: Fraunhofer-Gesellschaft zur Foerderung der angewandten Forschung e.V., Munich (DE)

(72) Inventors: Guillaume Fuchs, Bubenreuth (DE); Benjamin Schubert, Nuremberg (DE); Grzegorz Pietrzyk, Nuremberg (DE); Markus Multrus, Nuremberg (DE); Bernhard Grill, Rueckersdorf (DE)

(73) Assignee: Fraunhofer Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 15/417,232

(22) Filed: Jan. 27, 2017

(65) Prior Publication Data
US 2017/0142412 A1  May 18, 2017

Related U.S. Application Data

(63) Continuation of application No. PCT/EP2015/067001, filed on Jul. 24, 2015.

(30) Foreign Application Priority Data

Jul. 28, 2014  (EP) .................... 14178780

(51) Int. Cl.
*H04N 19/91*  (2014.01)
*H04N 19/126*  (2014.01)
(Continued)

(52) U.S. Cl.
CPC ......... *H04N 19/126* (2014.11); *G10L 19/035* (2013.01); *H04N 19/13* (2014.11);
(Continued)

(58) Field of Classification Search
CPC ...... H04N 19/126; H04N 19/91; H04N 19/70; H04N 19/44; H04N 19/184; H04N 19/13; G10L 19/035
(Continued)

(56) References Cited

U.S. PATENT DOCUMENTS 7,266,149 B2 * 9/2007 Holcomb ............. H04N 19/136
375/240.12
7,356,085 B2   4/2008 Gavrilescu et al.
(Continued)

FOREIGN PATENT DOCUMENTS

CN    1973547 A    5/2007
CN   101710990 A   5/2010
(Continued)

OTHER PUBLICATIONS

Paul et al, Performance improvement of HEVC using adaptive quantization (Year: 2014).*
(Continued)

*Primary Examiner* — Shan E Elahi
(74) *Attorney, Agent, or Firm* — Perkins Coie LLP; Michael A. Glenn

(57) ABSTRACT

Embodiments of the present invention provide an encoder comprising a quantization stage, an entropy encoder, a residual quantization stage and a coded signal former. The quantization stage is configured to quantize an input signal using a dead zone in order to obtain a plurality of quantized values. The entropy encoder is configured to encode the plurality of quantized values using an entropy encoding scheme in order to obtain a plurality of entropy encoded
(Continued)

values. The residual quantization stage is configured to quantize a residual signal caused by the quantization stage, wherein the residual quantization stage is configured to determine at least one quantized residual value in dependence on the dead zone of the quantization stage. The coded signal former is configured to form a coded signal from the plurality of entropy encoded values and the at least one quantized residual value.

16 Claims, 8 Drawing Sheets

(51) Int. Cl.
G10L 19/035 (2013.01)
H04N 19/13 (2014.01)
H04N 19/184 (2014.01)
H04N 19/44 (2014.01)
H04N 19/70 (2014.01)

(52) U.S. Cl.
CPC ........... H04N 19/184 (2014.11); H04N 19/44 (2014.11); H04N 19/70 (2014.11); H04N 19/91 (2014.11)

(58) Field of Classification Search
USPC .................................................. 375/240.03
See application file for complete search history.

(56) References Cited

U.S. PATENT DOCUMENTS

| 7,995,649 | B2* | 8/2011 | Zuo ...................... H04N 19/176 375/240.01 |
|---|---|---|---|
| 2003/0212551 | A1 | 11/2003 | Rose et al. |
| 2005/0013500 | A1* | 1/2005 | Lee ...................... H04N 19/176 382/251 |
| 2005/0041738 | A1* | 2/2005 | Lin ...................... H04N 19/176 375/240.03 |
| 2007/0147497 | A1* | 6/2007 | Bao ...................... H04N 19/124 375/240.03 |
| 2008/0080615 | A1 | 4/2008 | Tourapis |
| 2008/0193033 | A1 | 8/2008 | Kim et al. |
| 2008/0240235 | A1 | 10/2008 | Holcomb et al. |
| 2011/0022924 | A1 | 1/2011 | Malenovsky et al. |
| 2011/0078795 | A1 | 3/2011 | Liu |
| 2011/0173004 | A1* | 7/2011 | Bessette ................ G10L 19/005 704/500 |
| 2014/0010277 | A1* | 1/2014 | Wang ..................... H04N 19/70 375/240.02 |
| 2014/0016698 | A1* | 1/2014 | Joshi ..................... H04N 19/88 375/240.12 |
| 2014/0105299 | A1* | 4/2014 | Chen .................... H04N 19/597 375/240.15 |
| 2014/0112394 | A1* | 4/2014 | Sullivan ................ H04N 19/46 375/240.26 |
| 2014/0226721 | A1* | 8/2014 | Joshi .................... H04N 19/159 375/240.13 |
| 2015/0264376 | A1* | 9/2015 | Zou ...................... H04N 19/463 375/240.03 |

FOREIGN PATENT DOCUMENTS

| CN | 102017633 A | 4/2011 |
|---|---|---|
| EP | 1345331 B1 | 8/2008 |
| JP | 2005020384 A | 1/2005 |
| JP | 2009541815 A | 11/2009 |
| RU | 2012150074 A | 5/2014 |
| TW | 201338547 A | 9/2013 |
| TW | 201405549 A | 2/2014 |
| WO | 2006108736 A1 | 10/2006 |
| WO | 2008046492 A1 | 4/2008 |

OTHER PUBLICATIONS

Habermann et al, Syntax element partitioning for high-throughput HEVC CABAC decoding (Year: 2017).*
Yao et al, An efficient VLC encoder architecture for H.264 (Year: 2006).*

* cited by examiner

SOURCE CODING SCHEME USING ENTROPY CODING TO CODE A QUANTIZED SIGNAL ON A DETERMINED NUMBER OF BITS

CROSS-REFERENCE TO RELATED APPLICATIONS

This application is a continuation of copending International Application No. PCT/EP2015/067001, filed Jul. 24, 2015, which is incorporated herein by reference in its entirety, and additionally claims priority from European Application No. EP 14 178 780.4, filed Jul. 28, 2014, which is incorporated herein by reference in its entirety.

BACKGROUND OF THE INVENTION

Embodiments relate to an encoder, a decoder, a system comprising an encoder and a decoder, a method for encoding and a method for decoding. Some embodiments relate to apparatuses and methods for optimal residual quantization in source coding. Some embodiments relate to a source coding scheme using entropy coding to code a quantized signal on a determined number of bits.

Entropy coding is an efficient tool for exploiting the redundancy of symbols to transmit. It is usually used in transform-based coding after the quantization of the spectral lines. By exploiting an a priori probability distribution, the quantized values can be losslessly coded with a reduced number of bits. The principle lies in generating codewords for which the length is function of the symbol probability.

The bit consumption is usually only known after writing the entropy coded symbols into the bit stream. It is usually problematic when optimizing the quantization stage, which needs to know the bit consumption for optimizing the rate distortion function. It is even more problematic when the bit stream has to have a constant size per frame, also known as constant bitrate, which is a requirement for most of the communication network protocols.

In a transform encoder, a set of scale factors defines usually the quantization, by shaping the quantization noise in frequency domain. The noise shaping is function of both the perceived distortion, usually given by a psychoacoustic model, and the engendered bit consumption.

However the last factor is usually only known after fixing the quantization noise shaping. An optimization loop can be used for making the optimization converged. Nevertheless such an optimization is relatively complex and the number of iterations has to be strongly limited in real applications. Moreover for reducing even more the complexity, the bit consumption is usually not fully computed but only estimated. If the final bit consumption is underestimated, the bit-stream will have to be truncated, which is avoided most of the time. Indeed an underestimation will lead to a hard truncation of the bit stream, which is equivalent to make the quantization saturate. Thus, the quantization optimization is usually designed to over-estimate the bit consumption. As a consequence few bits are often unexploited in the final bit stream.

To overcome this problem, a residual (or second) quantization stage can be added after the first quantization stage for exploiting eventual unused bits. These remaining bits then can be used to refine the quantization noise. This principle is explained in the following.

FIG. 10 shows a block diagram of a transform encoder 10. The transform encoder 10 comprises a first quantization stage 12, a residual quantization stage 14, an entropy encoder 16, an entropy coding bit estimation unit 18, a multiplexer 20 and a transformation unit 22.

The transformation unit 22 is configured to transform an input signal from a time domain into a frequency domain. The first quantization stage 12 is configured to quantize the input signal in the frequency domain into a plurality of quantized spectral values q. The plurality of quantized spectral values q, the input signal in the frequency domain x and a number of remaining bits are input to the residual (or second) quantization stage 14 that is configured to refine the output of the first quantization stage 12 and to provide a plurality of quantized residual values $q_r$. The entropy encoder 16 is configured to entropy encode the plurality of quantized spectral values q in order to obtain a plurality of entropy encoded values e. The multiplexer 20 is configured to multiplex the plurality of entropy encoded values e, the scale factors in dependence on an information provided by the first quantization stage 14 and the plurality of quantized residual values delivered by the second quantization 16 in order to obtain a bit stream.

The transform encoder 10 shown in FIG. 10 is designed for delivering a certain target number of bits per frame. The quantization will be adjusted for reaching this target, but for complexity reasons only an estimation of the entropy encoder bit consumption is done when adjusting the quantization steps. Moreover even if the bit estimation is very accurate it may be impossible to find a set of scale factors which lead to the expected target bits. After the first quantization stage 12, quantized values q are entropy coded. The remaining unexploited bits are then allocated to the residual quantization which will refine the output of the first quantization stage 12. The residual quantization stage 14 takes as input the quantized spectral values q, the original spectral values x and a number of remaining bits. The number of remaining bits can be an estimate or the true number of remaining bits. The estimate is usually used when a local synthesis is necessitated at the encoder side for taking for example a switching decision in a closed-loop decision fashion as it is done in AMR-WB+ (Adaptive Multi-Rate Wide Band Extended). In that case, the residual coding has to be called before the eventual call of the entropy encoder 16.

In a common transform encoder 10, the residual quantization stage 14 performs a simple uniform scalar quantization of the difference of an inverse quantized input signal obtained by inverse quantizing the quantized spectral values and the original input signal. However, through rate-distortion performance analysis, it is known that the uniform quantization is only optimal for memoryless and uniformly distributed sources.

SUMMARY

According to an embodiment, an encoder may have: a quantization stage configured to quantize an input signal using a dead zone in order to obtain a plurality of quantized values; an entropy encoder configured to encode the plurality of quantized values using an entropy encoding scheme in order to obtain a plurality of entropy encoded values; a residual quantization stage configured to quantize a residual signal caused by the quantization stage, wherein the residual quantization stage is configured to determine, for a non-zero quantized value, at least one quantized residual value in dependence on a width of the dead zone of the quantization stage; and a coded signal former configured to form a coded signal from the plurality of entropy encoded values and the at least one quantized residual value; wherein the coded signal former is configured to form the coded signal by appending the at least one quantized residual value or a plurality of quantized residual values to the plurality of entropy encoded values until the coded signal has a maximum length available for a transfer to a decoder; wherein the residual quantization stage is configured to determine the at least one quantized residual value such that the quantized residual value has 1 bit for a non-zero quantized value, wherein the residual quantization stage is configured to determine the quantized residual value based on the comparison $x[i]<x\_Q[i]$; wherein $x[i]$ is the input signal, wherein $x\_Q[i]$ is the inverse quantized input signal, and wherein i is an index that is incremented by 1 for each obtained quantized value; wherein the residual quantization stage is configured to determine the quantized residual value such that the quantized residual value has 2 bits for a zero quantized value, wherein the residual quantization stage is configured to determine the quantized residual value based on the comparisons $|x[i]|<(C \cdot x\_Q[i])$ and $x[i]<0$; wherein C depends on the width of the dead zone of the quantization stage), wherein $x[i]$ is the input signal, wherein $x\_Q[i]$ is the inverse quantized input signal, and wherein i is an index that is incremented by 1 for each obtained quantized value; wherein the at least one quantized residual value is not entropy encoded.

According to another embodiment, a decoder may have: a coded signal parser configured to parse a coded signal in order to obtain a plurality of entropy encoded values and at least one quantized residual value; an entropy decoder configured to decode the plurality of entropy encoded values using an entropy decoding scheme in order to obtain a plurality of quantized values; and an inverse quantization stage configured to inverse quantize the plurality of quantized values in order to obtain an output signal; wherein the inverse quantization stage is configured to refine an inverse quantization level used for obtaining the output signal in dependence on the quantized residual value); wherein the inverse quantization stage is configured to refine an inverse quantization level for a non-zero quantized value in dependence on a quantized residual value and a width of the dead zone.

According to another embodiment, a system may have an inventive encoder and an inventive decoder.

According to another embodiment, a method for encoding may have the steps of: quantizing an input signal in order to obtain a plurality of quantized values using a dead zone; encoding the plurality of quantized values using an entropy encoding scheme in order to obtain a plurality of entropy encoded values; quantizing a residual signal caused by quantizing the input signal, wherein quantizing the residual signal comprises determining, for a non-zero quantized value, at least one quantized residual value in dependence on a width of the dead zone of the quantization stage; and forming a bit stream from the plurality of entropy encoded values and the plurality of quantized residual values; wherein forming the bitstream comprises appending the at least one quantized residual value or a plurality of quantized residual values to the plurality of entropy encoded values until the coded signal comprises a maximum length available for a transfer to a decoder; wherein quantizing the residual signal comprises determining the at least one quantized residual value such that the quantized residual value comprises 1 bit for a non-zero quantized value, wherein the residual quantization stage is configured to determine the quantized residual value based on the comparison 0 if $x[i]<x\_Q[i]$; wherein $x[i]$ is the input signal, wherein $x\_Q[i]$ is the inverse quantized input signal, and wherein i is an index that is incremented by 1 for each obtained quantized value; wherein quantizing the residual signal comprises determining the quantized residual value such that the quantized residual value comprises 2 bits for a zero quantized value, wherein the residual quantization stage is configured to determine the quantized residual value based on the comparisons $|x[i]|<(C \cdot x\_Q[i])$ and $x[i]<0$; wherein C depends on the width of the dead zone of the quantization stage, wherein $x[i]$ is the input signal, wherein $x\_Q[i]$ is the inverse quantized input signal, and wherein i is an index that is incremented by 1 for each obtained quantized value; wherein the at least one quantized residual value is not entropy encoded.

According to another embodiment, a method for decoding may have the steps of: parsing a coded signal in order to obtain a plurality of entropy encoded values and a quantized residual value; decoding the plurality of entropy encoded values using an entropy decoding scheme in order to obtain a plurality of quantized values; inverse quantizing the plurality of quantized values in order to obtain an output signal; and refining an inverse quantization level used for obtaining the output signal in dependence on a width of a dead zone and the quantized residual value; wherein refining the inverse quantization level comprises refining an inverse quantization level for a non-zero quantized value in dependence on a quantized residual value and a width of the dead zone.

Another embodiment may have a non-transitory digital storage medium having a computer program stored thereon to perform the method for encoding, the method having the steps of: quantizing an input signal in order to obtain a plurality of quantized values using a dead zone; encoding the plurality of quantized values using an entropy encoding scheme in order to obtain a plurality of entropy encoded values; quantizing a residual signal caused by quantizing the input signal, wherein quantizing the residual signal comprises determining, for a non-zero quantized value, at least one quantized residual value in dependence on a width of the dead zone of the quantization stage; and forming a bit stream from the plurality of entropy encoded values and the plurality of quantized residual values; wherein forming the bitstream comprises appending the at least one quantized residual value or a plurality of quantized residual values to the plurality of entropy encoded values until the coded signal comprises a maximum length available for a transfer to a decoder; wherein quantizing the residual signal comprises determining the at least one quantized residual value such that the quantized residual value comprises 1 bit for a non-zero quantized value, wherein the residual quantization stage is configured to determine the quantized residual value based on the comparison 0 if $x[i]<x\_Q[i]$; wherein $x[i]$ is the input signal, wherein $x\_Q[i]$ is the inverse quantized input signal, and wherein i is an index that is incremented by 1 for each obtained quantized value; wherein quantizing the residual signal comprises determining the quantized residual value such that the quantized residual value comprises 2 bits for a zero quantized value, wherein the residual quantization stage is configured to determine the quantized residual value based on the comparisons $|x[i]|<(C \cdot x\_Q[i])$ and $x[i]<0$; wherein C depends on the width of the dead zone of the quantization stage, wherein $x[i]$ is the input signal, wherein $x\_Q[i]$ is the inverse quantized input signal, and wherein i is an index that is incremented by 1 for each obtained quantized value; wherein the at least one quantized residual value is not entropy encoded, when said computer program is run by a computer.

Another embodiment may have a non-transitory digital storage medium having a computer program stored thereon to perform the method for decoding, the method having the steps of: parsing a coded signal in order to obtain a plurality of entropy encoded values and a quantized residual value; decoding the plurality of entropy encoded values using an entropy decoding scheme in order to obtain a plurality of quantized values; inverse quantizing the plurality of quantized values in order to obtain an output signal; and refining an inverse quantization level used for obtaining the output signal in dependence on a width of a dead zone and the quantized residual value; wherein refining the inverse quantization level has refining an inverse quantization level for a non-zero quantized value in dependence on a quantized residual value and a width of the dead zone, when said computer program is run by a computer.

Embodiments of the present invention provide an encoder comprising a quantization stage, an entropy encoder, a residual quantization stage and a coded signal former. The quantization stage is configured to quantize an input signal using a dead zone in order to obtain a plurality of quantized values. The entropy encoder is configured to encode the plurality of quantized values using an entropy encoding scheme in order to obtain a plurality of entropy encoded values. The residual quantization stage is configured to quantize a residual signal caused by the quantization stage, wherein the residual quantization stage is configured to determine at least one quantized residual value in dependence on the dead zone of the quantization stage. The coded signal former is configured to form a coded signal from the plurality of entropy encoded values and the at least one quantized residual value.

Further, embodiments of the present invention provide a decoder comprising a coded signal parser, an entropy decoder and an inverse quantization stage. The coded signal parser is configured to parse a coded signal in order to obtain a plurality of entropy encoded values and at least one quantized residual value. The entropy decoder is configured to decode the plurality of entropy encoded values using an entropy decoding scheme in order to obtain a plurality of quantized values. The inverse quantization stage is configured to inverse quantize the plurality of quantized values in order to obtain an output signal. Further, the inverse quantization stage is configured to refine an inverse quantization level used for obtaining the output signal in dependence on the quantized residual value and a dead zone.

According to the concept of the present invention, an error between the (original) input signal and an inverse quantized signal obtained by inverse quantizing the plurality of quantized values can be reduced or even optimized by a residual quantization stage at the encoder side that takes into account the dead zone which was used for quantizing the input signal and an inverse quantization stage at the decoder side that also takes into account this dead zone when refining the inverse quantization level used for obtaining the inverse quantized signal (referred to as output signal).

Furthermore, embodiments of the present invention provide a method for encoding. The method comprises quantizing an input signal in order to obtain a plurality of quantized values using a dead zone; encoding the plurality of quantized values using an entropy encoding scheme in order to obtain a plurality of entropy encoded values; quantizing a residual signal caused by a quantization by the quantization stage and determining a plurality of quantized residual values in dependence on the dead zone of the quantization stage; and forming a bit stream from the plurality of entropy encoded values and the plurality of quantized residual values.

Moreover, embodiments of the present invention provide a method for decoding, the method comprises parsing a coded signal in order to obtain a plurality of entropy encoded values and a quantized residual value; decoding the plurality of entropy encoded values using an entropy decoding scheme in order to obtain a plurality of quantized values; inverse quantizing the plurality of quantized values using a dead zone in order to obtain an output signal; and refining an inverse quantization level used for obtaining the output signal in dependence on a dead zone and the quantized residual value.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
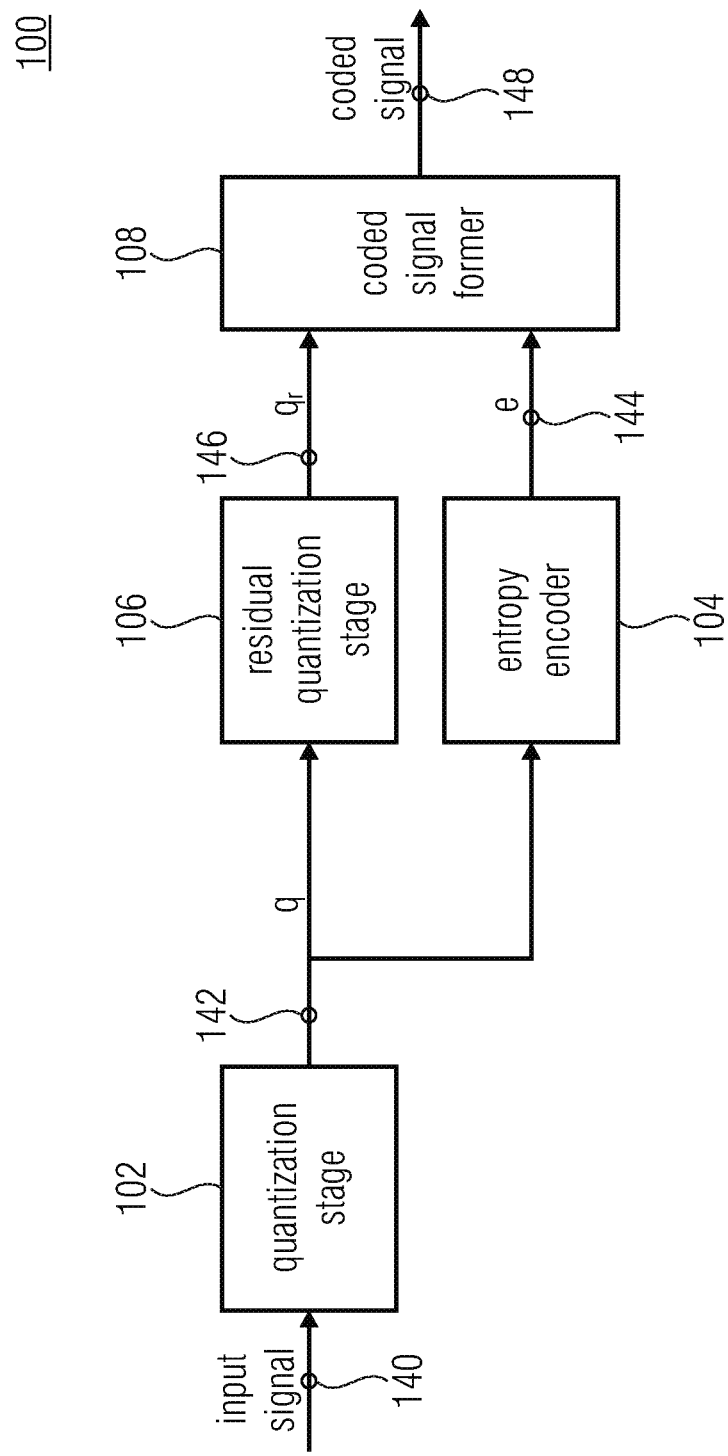
FIG. 1 shows a block diagram of an encoder according to an embodiment of the present invention.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Since entropy coding delivers variable length code-words, it is difficult to predict the exact bit consumption before writing the bit-stream. However the bit consumption is needed for optimizing the quantization. Most of the time and for complexity reasons, the quantization is suboptimal and some few bits are still unexploited. Residual quantization is a second layer of quantization which exploits these unused bits for refining the quantization error.

The below described embodiments of the present invention provide an encoder, a decoder and methods which optimize this residual quantization.

FIG. 1 shows a block diagram of an encoder 100 according to an embodiment of the present invention. The Encoder 100 comprises a quantization stage 102 (e.g., a first quantization stage), an entropy encoder 104, a residual quantization stage 106 (e.g., a second quantization stage) and a coded signal former 108. The quantization stage 102 is configured to quantize an input signal 140 using a dead zone in order to obtain a plurality of quantized values 142 (q). The entropy encoder 104 is configured to encode the plurality of quantized values 142 (q) using an entropy encoding scheme in order to obtain a plurality of entropy encoded values 144 (e). The residual quantization stage 106 is configured to quantize a residual signal caused by a quantization in the quantization stage 102, wherein the residual quantization stage 106 is configured to determine at least one quantized residual value 146 ($q_r$) in dependence on the dead zone of the quantization stage 102. The coded signal former 108 is configured to form a coded signal 148 from the plurality of entropy encoded values 144 (e) and the at least one quantized residual value 146 ($q_r$).

The idea of the present invention is to reduce or even optimize the error between the (original) input signal and an inverse quantized version of a quantized version of the input signal by a residual quantization stage at the encoder side that takes into account the dead zone which was used for quantizing the input signal and an inverse quantization stage at the decoder side that also takes into account this dead zone when refining the inverse quantization level used for obtaining the inverse quantized signal.

In embodiments, the quantization stage 102 can be configured to perform a dead zone uniform threshold scalar quantization (DZ-UTSQ).

In embodiments, the coded signal former 108 can be configured to form the coded signal 148 by appending the at least one quantized residual value 146 or a plurality of quantized residual values 146 to the plurality of entropy encoded values 144 until the coded signal 148 comprises a maximum length available for a transfer to a decoder. It is not restricted that the bit-stream contains other information as scale factors defining the first quantization stage noise shaping, or prediction coefficients used for shaping the quantization noise and used in a post-filtering of the output signal in tie domain.

For example, the coded signal former 108 may be configured to provide a bit stream as the coded signal 148. Thereby, the coded signal former 108, for example, a multiplexer, can be configured to add at an end of the bit stream the at least one quantized residual value 146 or a plurality of quantized residual values 146. The bit stream generated by the encoder 100 may be transferred (e.g., transmitted or broadcasted) to a decoder or may be stored, for example, on a non-volatile storage medium, for a later decoding by a decoder. Thereby, the bit stream may be transmitted or stored using data frames or data packets, wherein the bit stream may have to have a constant size (also referred herein as target bits) per data frame or data packet.

For obtaining a bit stream having a constant size or a predefined number of target bits the coded signal former 108 may be configured to append quantized residual values 146 to the entropy encoded values 144 until the bit stream reaches the predefined number of target bits. The residual quantization stage 106 may stop determining quantized residual values 146 when the bit stream comprises the predefined length or number of target bits.

In embodiments, the input signal 140 can be a frequency domain input signal 140. The encoder 100 can comprise a transformation unit configured to transform a time domain input signal into the frequency domain input signal 140.

Figure 2:
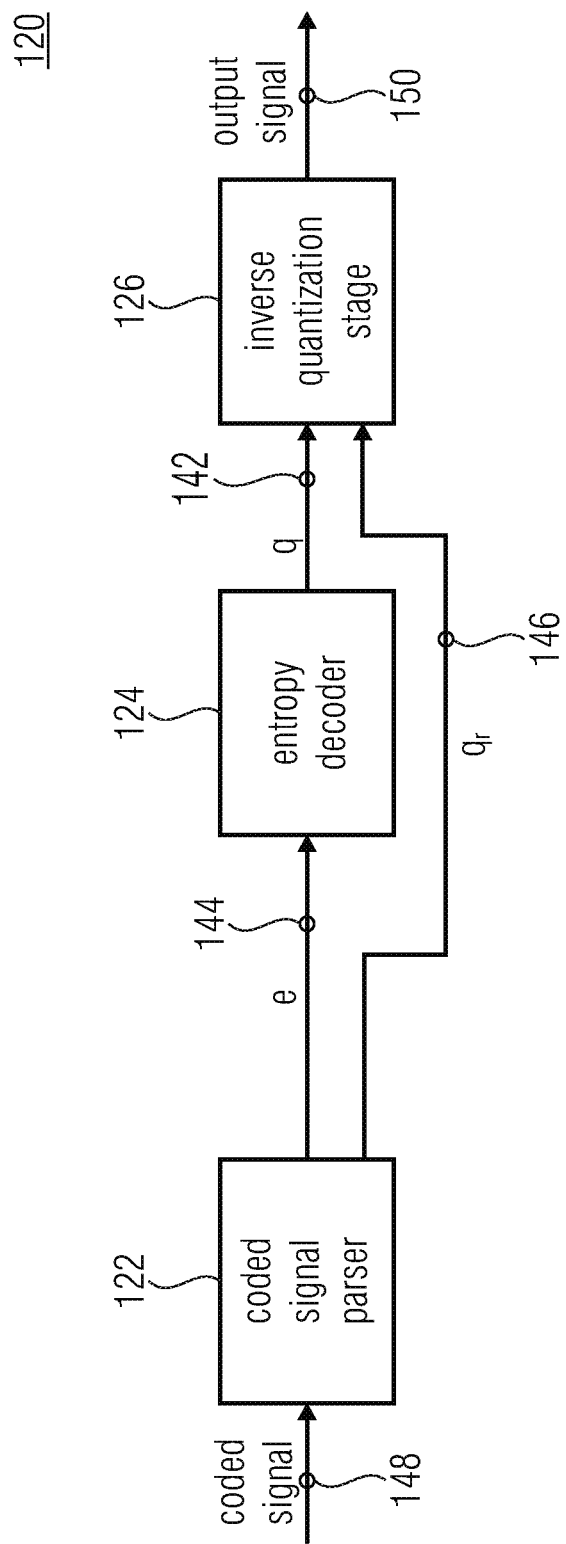
FIG. 2 shows a block diagram of a decoder according to an embodiment of the present invention.

FIG. 2 shows a block diagram of a decoder 120 according to an embodiment of the present invention. The decoder 120 comprises a coded signal parser 122, an entropy decoder 124 and an inverse quantization stage 126. The coded signal parser 122 is configured to parse a coded signal 148 in order to obtain a plurality of entropy encoded values 144 (e) and at least one quantized residual value 146 ($q_r$). The entropy decoder 124 is configured to decode the plurality of entropy encoded values 144 (e) using an entropy decoding scheme in order to obtain a plurality of quantized values 142 (q). The inverse quantization stage 126 is configured to inverse quantize the plurality of quantized values 142 (q) in order to obtain an output signal 150. Thereby, the inverse quantization stage 126 is configured to refine an inverse quantization level used for obtaining the output signal 150 in dependence on the quantized residual value 146 ($q_r$) and a dead zone used in an encoder 100 in a quantization stage 106 for obtaining the plurality of quantized values 142 (q).

In embodiments, the inverse quantization stage 126 can be configured to refine the inverse quantization level by determining a refined inverse quantization level in dependence on the dead zone.

For example, the inverse quantization stage 126 may be configured to determine in dependence on the dead zone, or more precisely, in dependence on a width of the dead zone, a level by which the inverse quantization level has to be refined, i.e. increased or decreased, in order to obtain the refined inverse quantization level. Further, the inverse quantization stage 126 may be configured to determine at least two new inverse quantization levels in dependence on the dead zone, and to obtain the output signal 150 by using one out of the at least two refined inverse quantization levels indicated by quantized residual value 146. In other words, the quantized residual value 146 indicates which out of the at least two refined inverse quantization levels is to be used for obtaining the output signal 150.

Figure 3:
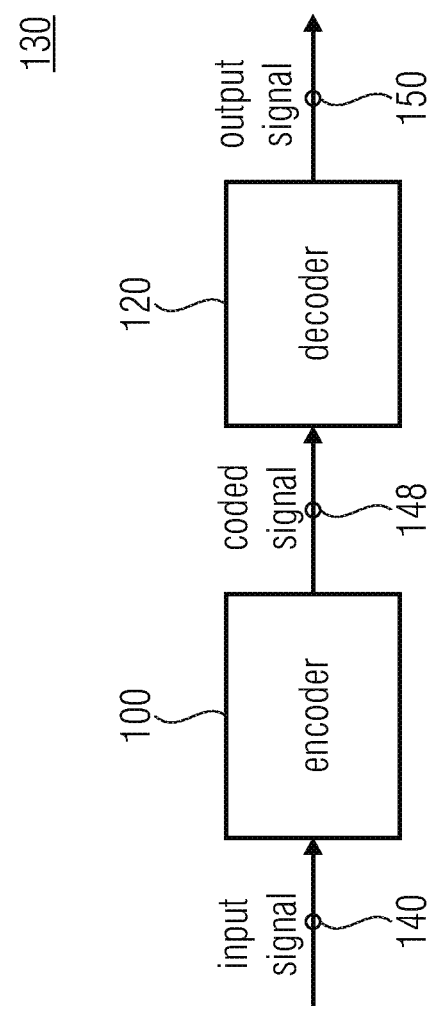
FIG. 3 shows a block diagram of a system according to an embodiment of the present invention.

FIG. 3 shows a block diagram of a system 130 according to an embodiment of the present invention. The system 130 comprises the encoder 100 shown in FIG. 1 and the decoder 120 shown in FIG. 2.

In the following, features of the encoder 100 and decoder 120 and the coaction or interaction of features of the encoder 100 and decoder 120 are described in further detail.

Figure 4:
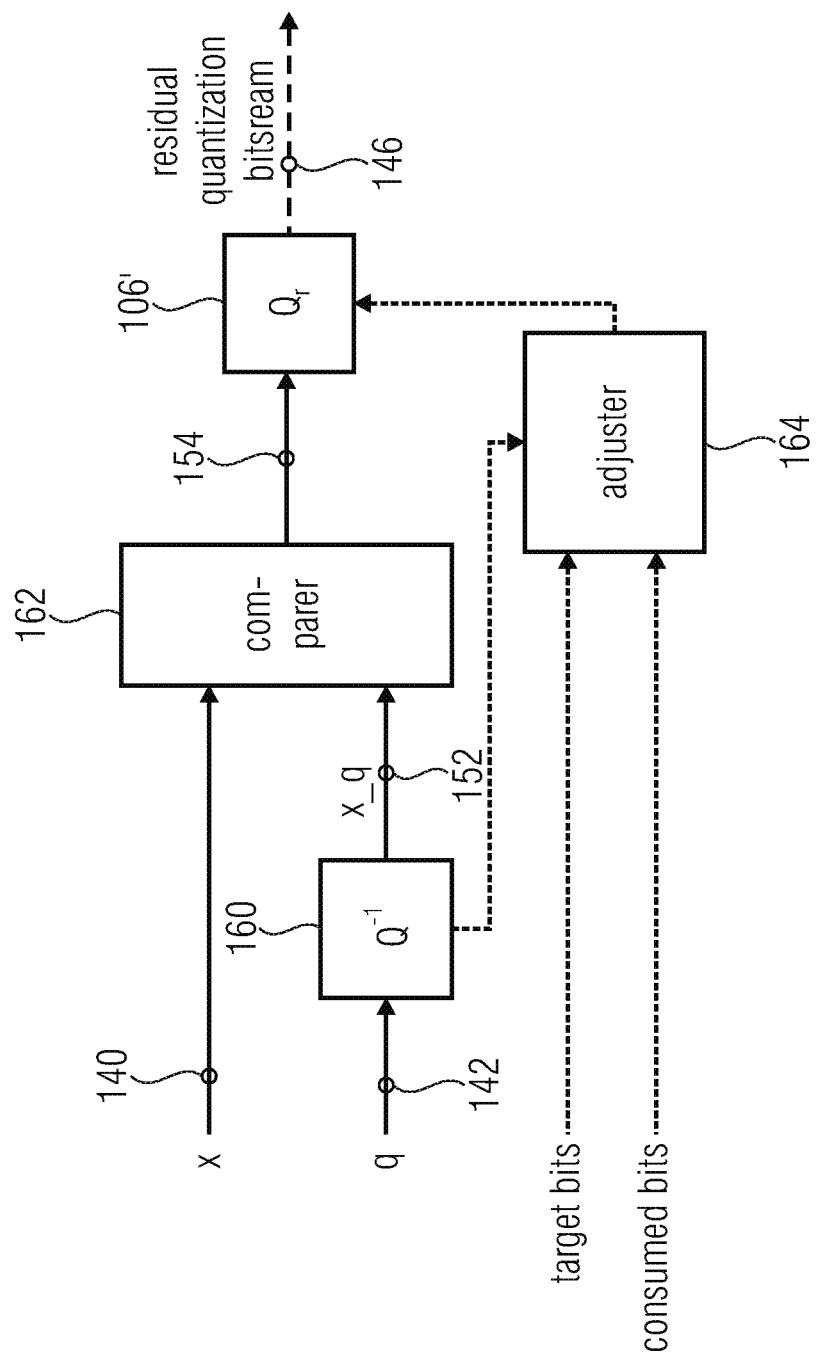
FIG. 4 shows a block diagram of the residual quantization stage according to an embodiment of the present invention.

FIG. 4 shows a block diagram of the residual quantization stage 106 according to an embodiment. The residual quantization stage 106 may comprise a residual quantizer 106', an inverse quantizer 160 and a comparer 162. The inverse quantizer 160 can be configured to inverse quantize the plurality of quantized values 142 (q) provided by the quantization stage 102 in order to obtain an inverse quantized input signal 152 (x_q). The comparison stage 162 can be configured to compare the input signal 140 (x) and the inverse quantized input signal 152 (x_q) in order to obtain the residual signal 154. The residual quantizer 106' can be configured to quantize the residual signal caused by the quantization stage 102.

In other words, the residual quantization block diagram is illustrated in FIG. 4. The spectrum 142 (q) is inversely quantized and compared to the original spectrum 140 (x). A second layer of quantization is then performed depending of the remaining bits available. The second quantization step performed by the residual quantization stage 106 is usually a greedy quantization, i.e. that the quantization is performed line per line and each re-quantized value is done independently from the following transmitted information. In that way the residual quantization bit-stream 146 ($q_r$) can be truncated whenever the bit-stream 148 provided by the coded signal former 108 reaches the desired size.

As shown in FIG. 4, the residual quantization stage 106 may further comprise a control unit 164, e.g., an adjuster. The control unit 164 may be configured to control or optimize the residual quantizer 106'.

For example, the control unit 164 may be configured to control the residual quantizer 106' such that the residual quantizer 106' quantizes the residual signal 154 in dependence on the dead zone, or more precisely, in dependence on a width of the dead zone used in the quantization stage 102 for obtaining the plurality of quantized values 142 (q). Further, the control unit 164 may be configured to control the residual quantizer 106' in dependence on a number of target bits and a number of consumed bits (e.g., consumed by the entropy encoded values 144 provided by the entropy encoder or by the entropy encoded values 144 and the quantized residual value(s) already provided by the residual quantizer 106'). Further, the control unit 164 may be configured to control the residual quantizer 106' in dependence on an information provided by the inverse quantizer 160. The information provided by the inverse quantizer 160 may include the width of the dead zone, which can be either fixed and modified adaptively, and may also include a scale factor applied in the first quantization stage for normalizing the spectrum and defining the quantization step, and may also include an indication if the quantized value was zeroed or not.

In a conventional residual quantization, Qr performed by the residual quantization stage is a simple uniform scalar quantization of the difference $x[i]-x\_q[i]$:

```
if x[i]>x_q[i]
    Qr[i]=(int)(0.5+(x[i]-x_q[i])/delta_r)
Else
    Qr[i]=(int)(-0.5+(x[i]-x_q[i])/delta_r)
``` wherein x[i] is the input signal 140, wherein x_Q[i] is the inverse quantized input signal 152, wherein (int) is an integer rounding function, and wherein delta_r is the quantization step of the residual quantizer Qr which is usually smaller that the quantization step delta used in the first quantizer Q. In general:

delta_r=0.5*delta

Embodiments of the present invention solve two problems related to the residual quantization. The first and main problem is how to get the optimal Qr (function of the residual quantization stage 106) knowing the first quantization stage 102. The second problem is how to minimize the mismatch between the encoder local synthesis and the decoder synthesis, when the number of remaining bits has to be estimated.

Through rate-distortion performance analysis, it is know that the uniform quantization (as used in a conventional residual quantization) is only optimal for memoryless and uniformly distributed sources. If an entropy coding is used afterwards, the uniform quantization is quasi optimal for a Gaussian source and at very high bit-rates. At lower rates the near optimal solution is to have a dead zone with uniform threshold scalar quantization (DZ-UTSQ). This family of quantizers is quasi optimal for a large range of distributions, e.g. Gaussian, Laplacian and generalized Laplacian. The dead zone factor can be optimized by different methods. It can be optimized in real time depending on estimate of the distribution. Simplier it can be fixed to a default best value found for expected input signals or adapted depending on some measures, like the tonality of the spectrum, which reflects also the distribution.

In the following, a solution to optimize the residual quantization Qr performed by the residual quantization stage 106 depending on a first stage DZ-UTSQ 102 is presented. The dead zone parameter is called dz and DZ-UTSQ 102 is defined as:

```
if x[i]>0
    Q[i]=(int)(rounding_dz+(x[i])/delta)
Else
    Q[i]=(int)(-rounding_dz+(x[i])/delta)
and
x_q[i]=delta*Q[i]
``` wherein x[i] is the input signal 140, wherein x_Q[i] is the inverse quantized input signal 152, wherein (int) is an integer rounding function, and wherein delta is the quantization step used in DZ-UTSQ 102, and wherein rounding_dz=1−dz/2.

Figure 5:
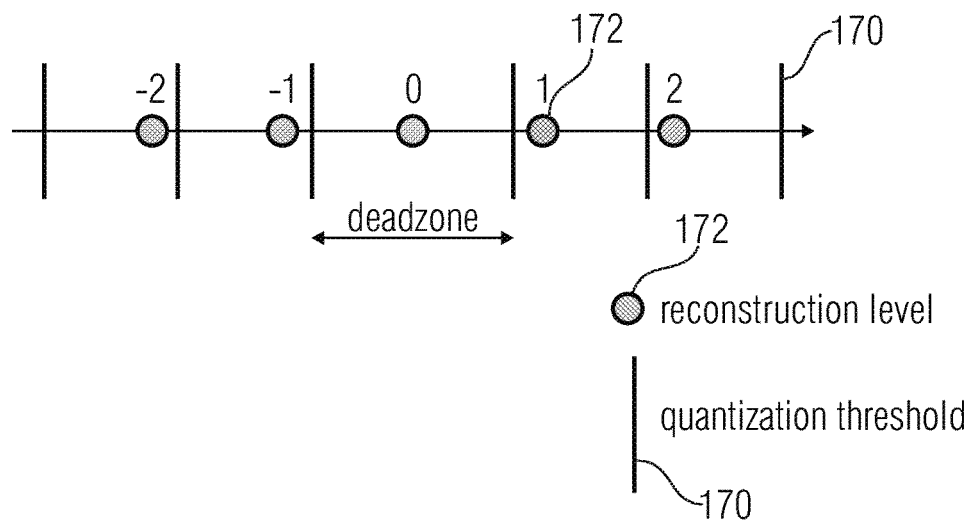
FIG. 5 shows in a diagram inverse quantization levels and quantization thresholds used in a dead zone uniform threshold scalar quantization scheme.

FIG. 5 illustrates the DZ-UTSQ 102 scheme, where the scale is normalized by delta. The dead zone is usually larger than the normalized cell size of step 1. A dead zone of 1.25 is a good estimate for most of the frequency transformed audio samples. It can be reduced if the signal is noisier and enlarged when it is more tonal.

Embodiments of the present invention define the optimal quantization refinement of the error x[i]-x_q[i]. Because the residual coding is not entropy constrained no additional dead zone is adopted in the residual quantization Qr. Moreover, the distribution of the quantization error of the first quantization stage 102 is assumed to be uniform in left and right parts of the quantization cell delimited by the reconstruction level 170. It is a high-rate assumption, i.e. the size of the new quantization cells are considered small enough for discarding non-even distributed errors within the cell. The assumption is valid for most of the target bit-rates.

There are two main cases: a sample was quantized with a non-zero value and a sample was quantized with a zero value.

For a non-zero quantized value, 1 bit can be allocated for the residual quantization Qr per sample and define two relative reconstruction levels fac_m and fac_p:

```
fac_p=0.5−rounding_dz*0.5=0.25*(dz)
fac_m=0.5*rounding_dz=0.5*(1−0.5*dz)
```

Figure 6:
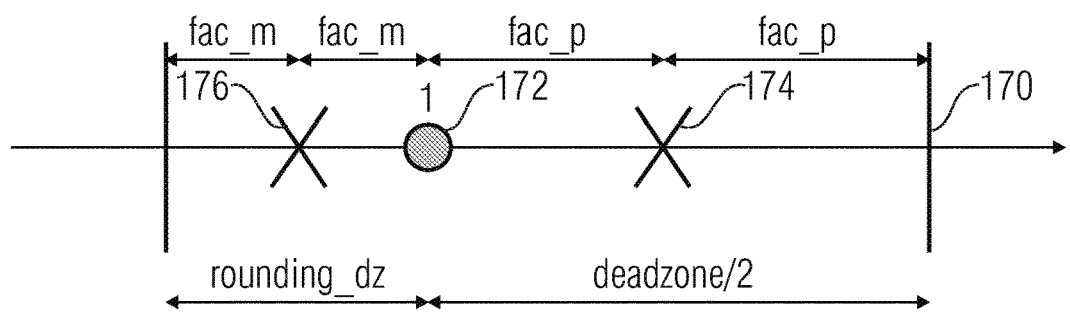
FIG. 6 shows in a diagram two refined inverse quantization levels for a non-zero quantized value.

Thereby, fac_p may indicate a normalized absolute value by which a normalized absolute value of the inverse quantization level (or reconstruction level) 172 is to be increased in order to obtain a first refined inverse quantization level 174 of the two refined inverse quantization levels 174 and 176, wherein fac_m indicates a normalized absolute value by which the normalized absolute value of the inverse quantization level 172 is to be decreased in order to obtain a second refined inverse quantization level 176 of the two refined inverse quantization levels 174 and 176, and wherein dz is a normalized width of the dead zone, as will become clear from FIG. 6

FIG. 6 illustrates the two relative (or refined) reconstructive levels 174 and 176 for a reconstruction level 172 of 1.

With 1 bit additional bit, the reconstruction level 172 can be refined with 1−fac_m (leading to the second refined inverse quantization level 176) or with 1+fac_p (leading to the first refined inverse quantization level 174). The original cell is split into two non-uniform cells. Because the quantization error of Q (quantization function of the first quantization stage 102) is assumed to be uniformly distributed within the new cells, the residual quantization Qr is optimal in terms of R-D performance. Please note that the quantization Q and the residual quantization Qr form an embedded quantization, i.e. the bit allocated to the residual quantization Qr can be discarded and still Q−1 can be performed.

The residual quantization Qr performed by the residual quantization stage 106 can be summarized by:

$$prm[n] = \begin{cases} 0 & \text{if } x[i] < x\_Q[i] \\ 1 & \text{otherwise} \end{cases}$$

wherein prm is a bit stream generated by the residual quantization stage 106 using the quantized residual value, wherein x[i] is the input signal, wherein x_Q[i] is the inverse quantized input signal, wherein n is an index that is incremented by 1 for each non-zero quantized value which is refined by $Q_r$, and wherein i is an index that is incremented by 1 for each obtained quantized value.

The inverse Qr can be then expressed as:

if (x_Q[i] > 0 &n < $N_{bits}$) then $$x\_Q[i] = \begin{cases} x\_Q[i] - \text{delta} * \text{fac\_m} & \text{if } prm[n] = 0 \\ x\_Q[i] + \text{delta} * \text{fac\_p} & \text{otherwise} \end{cases}$$

else if (n < $N_{bits}$) then $$x\_Q[i] = \begin{cases} x\_Q[i] - \text{delta} * \text{fac\_p} & \text{if } prm[n] = 0 \\ x\_Q[i] + \text{delta} * \text{fac\_m} & \text{otherwise} \end{cases}$$

It can be seen that the inverse Qr is only performed for $N_{bits}$ first bits. That means that the encoder can generate more bits than the encoder or decoder will actually decode. This mechanism is used when the remaining number of bits is estimated and when the local synthesis at the encoder side needs to generated. The expected reconstructed signal is generated at the encoder although it is possible for the decoder to decode more or less bits depending of the true remaining available bits in the bit stream.

Alternatively, more than 1 bit can be allocated per sample to Qr. With the same principle the optimal reconstruction levels for 2 power of bits Qr reconstruction levels can be defined.

For a zero quantized value, the residual quantization Qr can be allocated with more than 1 bit. The reason is that for perceptual reason it is necessitated to have zero as a reconstruction level. It avoids for example creating an artificial noisy signal during silence. A special 3 levels variable length code can be used:
 0: code a zero
 10: a negative reconstruction level
 11: a positive reconstruction level
A new relative reconstruction level is computes, fac_z:

fac_z=dz/3

Figure 7:
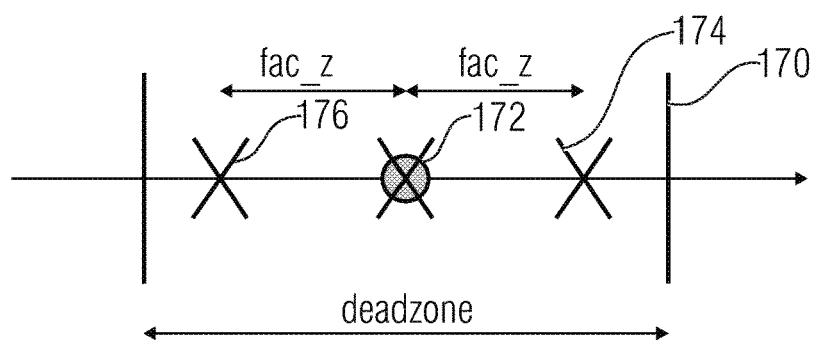
FIG. 7 shows in a diagram three refined inverse quantization levels for a zero quantized value.

Thereby fac_z may indicate a normalized absolute value by which a normalized absolute value of the inverse quantization level 172 is to be increased in order to obtain a first refined inverse quantization level 174 of the two refined inverse quantization levels 174 and 176 and a normalized absolute value by which a normalized absolute value of the inverse quantization level is to be decreased in order to obtain a second refined inverse quantization level 176 of the two refined inverse quantization levels 174 and 176, and wherein dz is a normalized width of the dead zone, as will become clear from FIG. 7.

FIG. 7 illustrates the residual quantization Qr performed by the residual quantization stage 106 for a zero quantized values 142. The cell around zero is divided in three uniform new cells.

The residual quantization Qr performed by the residual quantization stage 106 for a zero quantized value can be summarized by $$prm[n] = \begin{cases} 0 & \text{if } |x[i]| < (C \cdot x\_Q[i]) \\ 1 & \text{otherwise} \end{cases}$$

if $prm[n] == 1$ then $$prm[n+1] = \begin{cases} 0 & \text{if } x[i] < 0 \\ 1 & \text{otherwise} \end{cases}$$

wherein C depends on the dead zone of the quantization stage and may be calculated to C=delta*(fac_z/2), wherein prm is a bit stream generated by the residual quantization stage 106 using the quantized residual value, wherein x[i] is the input signal, wherein x_Q[i] is the inverse quantized input signal. The index n is incremented by 1 for each zero quantized value requantized to zero, wherein n is incremented by 2 for each zero quantized value requantized to a non-zero value.

The inverse Qr can be then expressed as:

if (n < $N_{bits}$) then $$x\_Q[i] = \begin{cases} \text{delta} * \text{fac\_z} & \text{if } prm[n] = 1 \text{ \&} prm[n+1] = 1 \\ -\text{delta} * \text{fac\_z} & \text{if } prm\{n\} = 1 \text{ \&} prm[n+1] = 0 \\ 0 & \text{otherwise} \end{cases}$$

Embodiments of the present invention can easily be extended with the assumption that the distribution within the original quantization cell is not uniform. In this case, the relative reconstruction levels can be derived depending on the distribution of the quantization error. A way of achieving it is to split the original quantization cell into non-uniform new smaller cells. A second dead zone parameter can be used as well.

In the following, further embodiments of the encoder 100 and decoder 120 are briefly described.

First, the encoder 100 is described.

The residual quantization is a refinement quantization layer refining the first SQ stage (or quantization stage 102). It exploits eventual unused bits, i.e. unused bits=target_bits−nbbits, where nbbits is the number of bits consumed by the entropy coder 104. The residual quantization adopts a greedy strategy and no entropy in order to stop the coding whenever the bit stream reaches the desired size.

The refinement consists of re-quantizing the quantized spectrum line per line. First, the non-zero quantized lines are processed with a 1 bit residual quantizer:

```
if (X[k] < X̂[k]) then
    write_bit (0)
else then
    write_bit (1)
```

Thereby, X[k] is a scaled sample of the input signal 140 and X[k] is the scaled corresponding sample of the inverse quantized input signal 152.

Finally, if remaining bits allow, the zero quantized lines are considered and quantized with on 3 levels as follows:

```
fac_z = (1 - rounding_dz) · 0.66
if( |X[k]| <0.5 · fac_z · X̂[k]) then
    write_bit(0)
else then
    write_bit(1)
    write_bit((1 + sgn(X[k]))/ 2)
```

Thereby, X[k] is a scaled sample of the input signal 140, X[k̂] is the corresponding scaled sample of the inverse quantized input signal 152, fac_z may indicate a normalized absolute value by which a normalized absolute value of the inverse quantization level 172 is to be increased in order to obtain a first refined inverse quantization level 174 of the two refined inverse quantization levels 174 and 176 and a normalized absolute value by which a normalized absolute value of the inverse quantization level is to be decreased in order to obtain a second refined inverse quantization level 176 of the two refined inverse quantization levels 174 and 176, wherein rounding_dz=1−dz/2.

Second, the decoder 120 is described.

The remaining bits refine the non-zero decoded lines. 1 bit per non-zero spectral value is read:

$$fac\_p = (1 - rounding\_dz)/2$$
$$fac\_m = rounding\_dz/2$$
$$\text{if } (read\_bit( ) == 0) \text{ then}$$
$$\hat{X}[k] = \begin{cases} \hat{X}[k] - fac\_m & \text{if } \hat{X}[k] > 0 \\ \hat{X}[k] - fac\_p & \text{otherwise} \end{cases}$$
$$\text{else then}$$
$$\hat{X}[k] = \begin{cases} \hat{X}[k] + fac\_p & \text{if } \hat{X}[k] > 0 \\ \hat{X}[k] + fac\_m & \text{otherwise} \end{cases}$$

Thereby, X[k] is the input signal 140, X[k̂] is the inverse quantized input signal 152, fac_p may indicate a normalized absolute value by which a normalized absolute value of the inverse quantization level (or reconstruction level) 172 is to be increased in order to obtain a first refined inverse quantization level 174 of the two refined inverse quantization levels 174 and 176, and fac_m may indicate a normalized absolute value by which the normalized absolute value of the inverse quantization level 172 is to be decreased in order to obtain a second refined inverse quantization level 176 of the two refined inverse quantization levels 174 and 176, wherein rounding_dz=1−dz/2

If at least 2 bits are left to read, a zero value is refined as:

```
fac_z = (1 - rounding_dz) · 0.66
if (read_bit( ) == 0) then
    X̂[k] = 0
else then
    if (read_bit( ) == 0) then
        X̂[k] = - fac_z
    else then
        X̂[k] = fac_z
```

Thereby, X[k] is a scaled sample of the input signal 140, X[k̂] is the corresponding scaled sample of the inverse quantized input signal 152, fac_z may indicate a normalized absolute value by which a normalized absolute value of the inverse quantization level 172 is to be increased in order to obtain a first refined inverse quantization level 174 of the two refined inverse quantization levels 174 and 176 and a normalized absolute value by which a normalized absolute value of the inverse quantization level is to be decreased in order to obtain a second refined inverse quantization level 176 of the two refined inverse quantization levels 174 and 176, wherein rounding_dz=1−dz/2.

Figure 8:
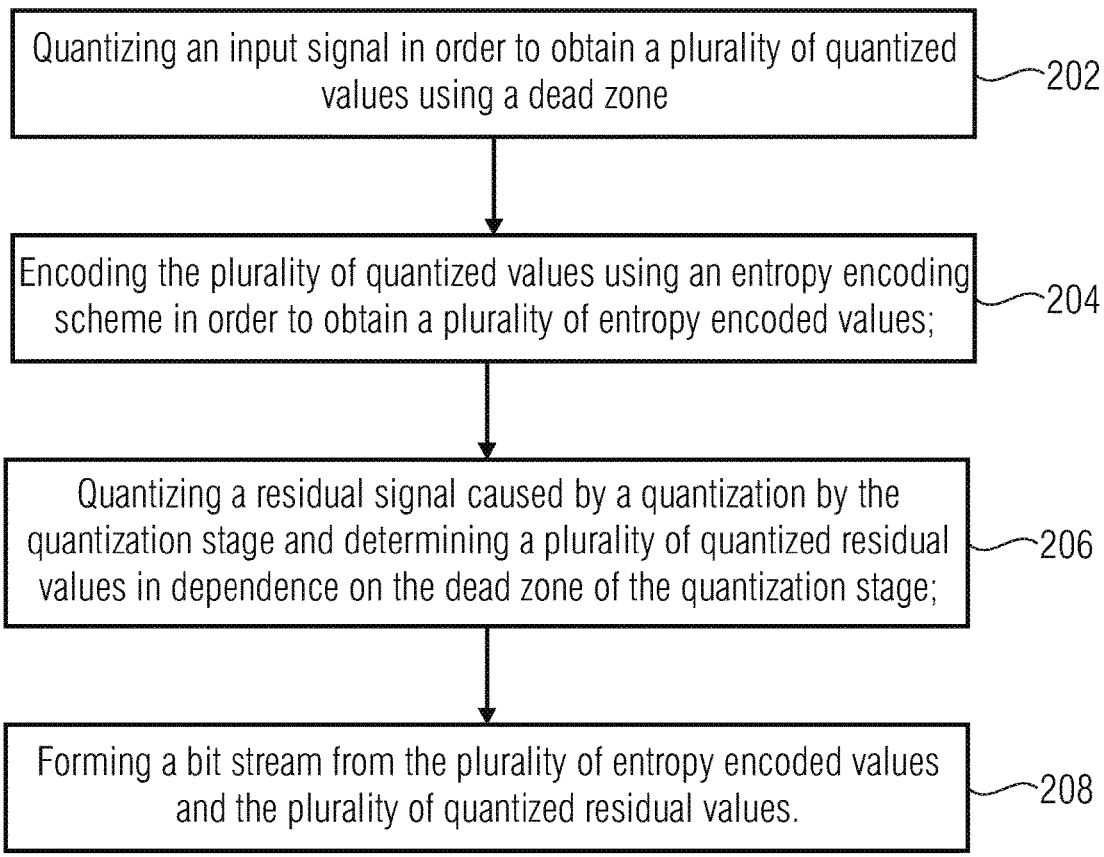
FIG. 8 shows a flowchart of a method for encoding according to an embodiment of the present invention.

FIG. 8 shows a flow chart of a method for encoding 200 according to an embodiment. The method 200 comprises a step 202 of quantizing an input signal in order to obtain a plurality of quantized values using a dead zone; a step 204 of encoding the plurality of quantized values using an entropy encoding scheme in order to obtain a plurality of entropy encoded values; a step 206 of quantizing a residual signal caused by a quantization by the quantization stage and determining a plurality of quantized residual values in dependence on the dead zone of the quantization stage; and a step 208 of forming a bit stream from the plurality of entropy encoded values and the plurality of quantized residual values.

Figure 9:
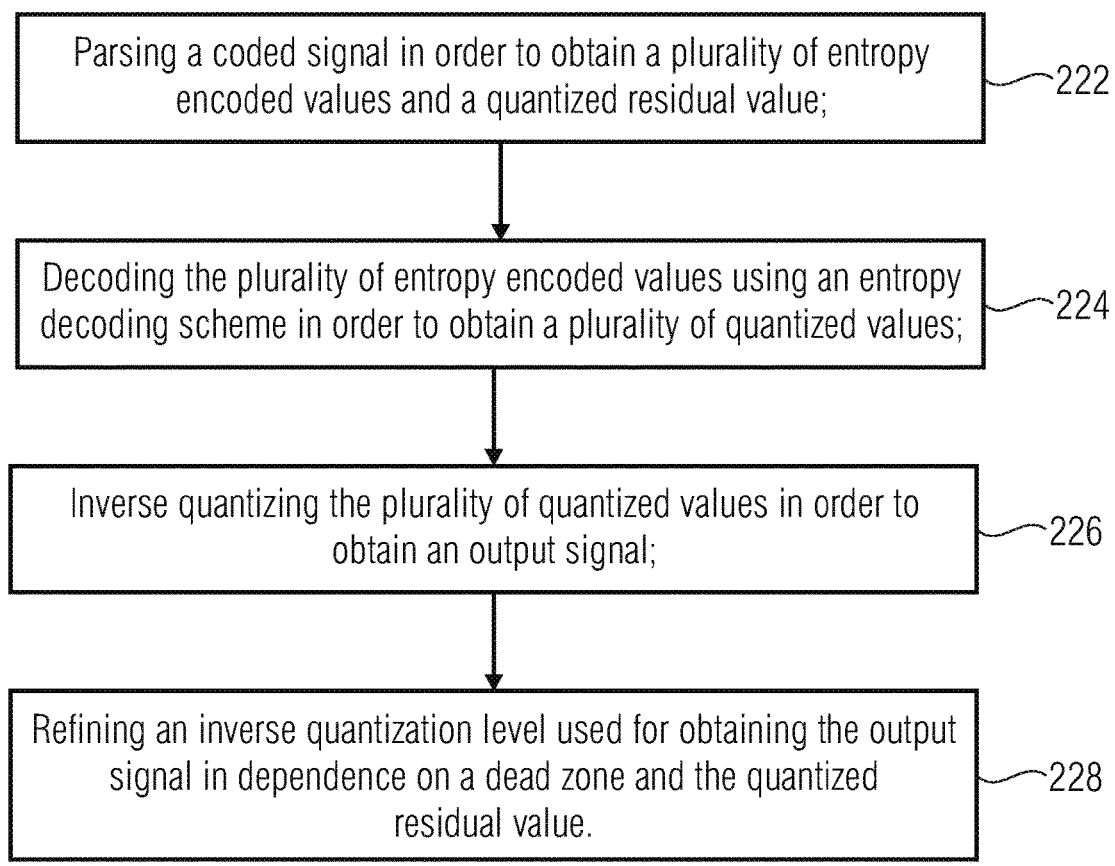
FIG. 9 shows a flowchart of a method for decoding according to an embodiment of the present invention.
Figure 10:
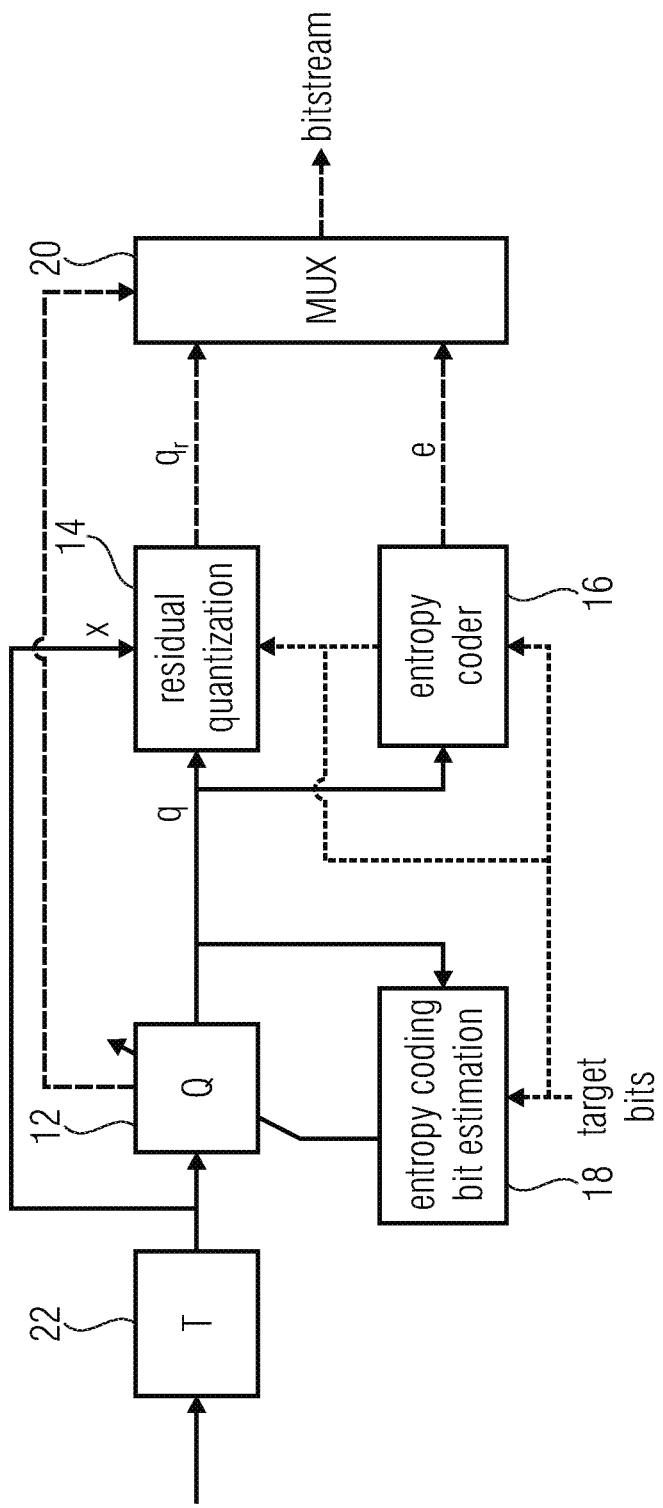
FIG. 10 shows a block diagram of a conventional transform encoder using a residual quantization.

FIG. 9 shows a flow chart of a method for decoding 220 according to an embodiment. The method 220 comprises a step 222 of parsing a coded signal in order to obtain a plurality of entropy encoded values and a quantized residual value; a step 224 of decoding the plurality of entropy encoded values using an entropy decoding scheme in order to obtain a plurality of quantized values; a step 226 of inverse quantizing the plurality of quantized values using a dead zone in order to obtain an output signal; and a step 228 of refining an inverse quantization level used for obtaining the output signal in dependence on a dead zone and the quantized residual value.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Encoder, comprising:
a quantization stage configured to quantize an input signal using a dead zone in order to acquire a plurality of quantized values;
an entropy encoder configured to encode the plurality of quantized values using an entropy encoding scheme in order to acquire a plurality of entropy encoded values;
a residual quantization stage configured to quantize a residual signal caused by the quantization stage, wherein the residual quantization stage is configured to determine, for a non-zero quantized value, at least one quantized residual value and a width of a residual quantization cell in dependence on the dead zone of the quantization stage; and
a coded signal former configured to form a coded signal from the plurality of entropy encoded values and the at least one quantized residual value;
wherein the coded signal former is configured to form the coded signal by appending the at least one quantized residual value or a plurality of quantized residual values to the plurality of entropy encoded values until the coded signal comprises a maximum length available for a transfer to a decoder;
wherein the at least one quantized residual value is not entropy encoded in order to stop the coding whenever the coded signal comprises the maximum length available for the transfer to the decoder;
wherein the residual quantization stage is configured to re-quantize the quantized spectrum line by line, by
first, determining the at least one quantized residual value such that the quantized residual value comprises 1 bit for a non-zero quantized value, wherein the residual quantization stage is configured to determine the quantized residual value based on the syntax $$prm[n] = \begin{cases} 0 & \text{if } x[i] < x\_Q[i] \\ 1 & \text{otherwise} \end{cases}$$

wherein prm is a bit stream generated by the residual quantization stage using the quantized residual value, wherein x[i] is the input signal, wherein x_Q[i] is the inverse quantized input signal, wherein n is an index that is incremented by 1 for each non-zero quantized value, and wherein i is an index that is incremented by 1 for each obtained quantized value;
and second, if remaining bits allow, determining the quantized residual value such that the quantized residual value comprises 2 bits for a zero quantized value, wherein the residual quantization stage is configured to determine the quantized residual value based on the syntax $$prm[n] = \begin{cases} 0 & \text{if } |x[i]| < (C \cdot x\_Q[i]) \\ 1 & \text{otherwise} \end{cases}$$

if $prm[n] == 1$ then $$prm[n+1] = \begin{cases} 0 & \text{if } x[i] < 0 \\ 1 & \text{otherwise} \end{cases}$$

wherein C depends on the dead zone of the quantization stage, wherein prm is a bit stream generated by the residual quantization stage using the quantized residual value, wherein x[i] is the input signal, wherein x_Q[i] is the inverse quantized input signal, wherein n is an index that is incremented by 1 for each zero quantized value that is requantized to a zero quantized value and incremented by 2 for each zero quantized value that is requantized to a non-zero quantized value, and wherein i is an index that is incremented by 1 for each obtained quantized value;

wherein at least one out of the quantization stage, the entropy encoder, the residual quantization stage and the coded signal former is implemented by means of a processor or electronic device.

2. Encoder according to claim 1, wherein the residual quantization stage comprises:

an inverse quantizer configured to inverse quantize the plurality of quantized values in dependence on the dead zone of the quantization stage in order to acquire an inverse quantized input signal;

wherein the residual quantization stage is configured to determine the at least one quantized residual value such that the quantized residual value comprises 1 bit for a non-zero quantized value; and wherein the residual quantization stage is configured to determine, for the non-zero quantized value, that the quantized residual value comprises a logic 0 if the input signal is smaller than the inverse quantized input signal for the non-zero quantized value, and to determine, for the non-zero quantized value, that the quantized residual value comprises a logic 1 else.

3. Encoder according to claim 1, wherein the residual quantization stage comprises:

an inverse quantizer configured to inverse quantize the plurality of quantized values in dependence on the dead zone in order to acquire an inverse quantized input signal; and a comparer configured to compare the input signal and the inverse quantized input signal.

4. Encoder according to claim 3, wherein the comparer is configured to compare the input signal and the inverse quantized input signal in order to acquire the residual signal;

wherein the residual quantization stage is configured to quantize the residual signal in dependence on the dead zone.

5. Encoder according to claim 4, wherein the residual quantization stage is configured to determine the at least one quantized residual value such that the quantized residual value comprises 1 bit for a non-zero quantized value; and wherein the residual quantization stage is configured to determine, for the non-zero quantized value, that the quantized residual value comprises a logic 0 if the residual signal is negative for the non-zero quantized value, and to determine, for the non-zero quantized value, that the quantized residual value comprises a logic 1 else.

6. Encoder according to claim 1, wherein the coded signal former is configured to provide a bit stream as the coded signal, wherein the coded signal former is configured to form the bit stream from the plurality of entropy encoded values and the plurality of quantized residual values, wherein the coded signal former is configured to append the quantized residual values to the entropy encoded values, wherein the residual quantization stage comprises:

a residual quantizer; and an adjuster configured to control the residual quantizer to quantize the residual signal in dependence on a width of the dead zone used in the quantization stage for acquiring the plurality of quantized values;

wherein the adjuster is configured to acquire a number of target bits and a number of consumed bits; and wherein the adjuster is configured to control the residual quantization stage to stop determining quantized residual values when the bit stream comprises the number of target bits.

7. Decoder, comprising:

a coded signal parser configured to parse a coded signal in order to acquire a plurality of entropy encoded values and at least one quantized residual value;

an entropy decoder configured to decode the plurality of entropy encoded values using an entropy decoding scheme in order to acquire a plurality of quantized values; and an inverse quantization stage configured to inverse quantize the plurality of quantized values in order to acquire an output signal;

wherein the inverse quantization stage is configured to refine an inverse quantization level used for acquiring the output signal in dependence on the quantized residual value;

wherein the inverse quantization stage is configured to refine an inverse quantization level for a non-zero quantized value in dependence on a quantized residual value and a width of the dead zone;

wherein the inverse quantization stage (126) is configured to refine the inverse quantization level (172) by determining a refined inverse quantization level (174, 176) in dependence on the dead zone;

wherein the inverse quantization stage (126) is configured to determine two refined inverse quantization levels (174, 176) for a non-zero quantized value, wherein the inverse quantization stage (126) is configured to obtain the output signal (150) by using one out of the two refined inverse quantization levels (174, 176) indicated by quantized residual value;

wherein the inverse quantization stage (126) is configured to determine the two refined inverse quantization levels (174, 176) for a non-zero quantized value based on the two factors:

$fac\_p = 0.25*dz$ $fac\_m = 0.5*(1-0.5*dz)$ wherein fac_p indicates a normalized absolute value by which a normalized absolute value of the inverse quantization level (172) is to be increased in order to obtain a first of the two refined inverse quantization levels (174), wherein fac_m indicates a normalized absolute value by which the normalized absolute value of the inverse quantization level (172) is to be decreased in order to obtain a second of the two refined inverse quantization levels (176), and wherein dz is a normalized width of the dead zone;

wherein the inverse quantization stage (126) is configured to determine two refined inverse quantization levels (174, 176) for a zero quantized value, wherein the inverse quantization stage (126) is configured to obtain the output signal (150) by using one out of the inverse quantization level (172) and two refined inverse quantization levels (174, 176) indicated by quantized residual value;

wherein the inverse quantization stage (126) is configured to determine the two refined inverse quantization levels (174, 176) for the zero quantized value based on the factor:

$fac\_z = dz/3$ wherein fac_z indicates a normalized absolute value by which a normalized absolute value of the inverse quantization level (172) is to be increased in order to obtain a first of the two refined inverse quantization levels (174) and a normalized absolute value by which a normalized absolute value of the inverse quantization level (172) is to be decreased in order to obtain a second of the two refined inverse quantization levels (176), and wherein dz is a normalized width of the dead zone;

wherein at least one out of the coded signal parser, the entropy decoder and the inverse quantization stage is implemented by means of a processor or electronic device.

8. Decoder according to claim 7, wherein the inverse quantization stage is configured to refine the inverse quantization level by determining a refined inverse quantization level in dependence on the dead zone.

9. Decoder according to claim 8, wherein the inverse quantization stage is configured to determine two refined inverse quantization levels for a non-zero quantized value, wherein the inverse quantization stage is configured to acquire the output signal by using one out of the two refined inverse quantization levels indicated by quantized residual value.

10. Decoder according to claim 9, wherein the inverse quantization stage is configured to increase a normalized absolute value of the inverse quantization level by an increase value in order to acquire a first of the two refined inverse quantization levels;
wherein the inverse quantization stage is configured to decrease a normalized absolute value of the inverse quantization level by a decrease value in order to acquire a second of the two refined inverse quantization levels; and
wherein the increase value and the decrease value are different from each other.

11. Decoder according to claim 7, wherein the inverse quantization stage is configured to increase a normalized absolute value of the inverse quantization level by an increase value in order to acquire a first of the two refined inverse quantization levels;
wherein the inverse quantization stage is configured to decrease a normalized absolute value of the inverse quantization level by a decrease value in order to acquire a second of the two refined inverse quantization levels.

12. System, comprising:
an encoder; and
a decoder;
wherein the encoder comprises a quantization stage configured to quantize an input signal using a dead zone in order to acquire a plurality of quantized values;
wherein the encoder comprises an entropy encoder configured to encode the plurality of quantized values using an entropy encoding scheme in order to acquire a plurality of entropy encoded values;
wherein the encoder comprises a residual quantization stage configured to quantize a residual signal caused by the quantization stage, wherein the residual quantization stage is configured to determine, for a non-zero quantized value, at least one quantized residual value and a width of a residual quantization cell in dependence on the dead zone of the quantization stage; and
wherein the encoder comprises a coded signal former configured to form a coded signal from the plurality of entropy encoded values and the at least one quantized residual value;

wherein the coded signal former is configured to form the coded signal by appending the at least one quantized residual value or a plurality of quantized residual values to the plurality of entropy encoded values until the coded signal comprises a maximum length available for a transfer to a decoder;
wherein the at least one quantized residual value is not entropy encoded in order to stop the coding whenever the coded signal comprises the maximum length available for the transfer to the decoder;
wherein the residual quantization stage is configured to re-quantize the quantized spectrum line by line, by
first, determining the at least one quantized residual value such that the quantized residual value comprises 1 bit for a non-zero quantized value, wherein the residual quantization stage is configured to determine the quantized residual value based on the syntax $$prm[n] = \begin{cases} 0 & \text{if } x[i] < x\_Q[i] \\ 1 & \text{otherwise} \end{cases}$$

wherein prm is a bit stream generated by the residual quantization stage using the quantized residual value, wherein x[i] is the input signal, wherein x_Q[i] is the inverse quantized input signal, wherein n is an index that is incremented by 1 for each non-zero quantized value, and wherein i is an index that is incremented by 1 for each obtained quantized value;
and second, if remaining bits allow, determining the quantized residual value such that the quantized residual value comprises 2 bits for a zero quantized value, wherein the residual quantization stage is configured to determine the quantized residual value based on the syntax $$prm[n] = \begin{cases} 0 & \text{if } |x[i]| < (C \cdot x\_Q[i]) \\ 1 & \text{otherwise} \end{cases}$$

if $prm[n] == 1$ then $$prm[n+1] = \begin{cases} 0 & \text{if } x[i] < 0 \\ 1 & \text{otherwise} \end{cases}$$

wherein C depends on the dead zone of the quantization stage, wherein prm is a bit stream generated by the residual quantization stage using the quantized residual value, wherein x[i] is the input signal, wherein x_Q[i] is the inverse quantized input signal, wherein n is an index that is incremented by 1 for each zero quantized value that is requantized to a zero quantized value and incremented by 2 for each zero quantized value that is requantized to a non-zero quantized value, and wherein i is an index that is incremented by 1 for each obtained quantized value;
wherein at least one out of the quantization stage, the entropy encoder, the residual quantization stage and the coded signal former is implemented by means of a processor or electronic device;
wherein the decoder comprises a coded signal parser configured to parse a coded signal in order to acquire a plurality of entropy encoded values and at least one quantized residual value;
wherein the decoder comprises an entropy decoder configured to decode the plurality of entropy encoded values using an entropy decoding scheme in order to acquire a plurality of quantized values; and wherein the decoder comprises an inverse quantization stage configured to inverse quantize the plurality of quantized values in order to acquire an output signal;

wherein the inverse quantization stage is configured to refine an inverse quantization level used for acquiring the output signal in dependence on the quantized residual value;

wherein the inverse quantization stage is configured to refine an inverse quantization level for a non-zero quantized value in dependence on a quantized residual value and a width of the dead zone;

wherein the inverse quantization stage (126) is configured to refine the inverse quantization level (172) by determining a refined inverse quantization level (174, 176) in dependence on the dead zone;

wherein the inverse quantization stage (126) is configured to determine two refined inverse quantization levels (174, 176) for a non-zero quantized value, wherein the inverse quantization stage (126) is configured to obtain the output signal (150) by using one out of the two refined inverse quantization levels (174, 176) indicated by quantized residual value;

wherein the inverse quantization stage (126) is configured to determine the two refined inverse quantization levels (174, 176) for a non-zero quantized value based on the two factors:

$$fac\_p = 0.25 * dz$$

$$fac\_m = 0.5 * (1 - 0.5 * dz)$$

wherein fac_p indicates a normalized absolute value by which a normalized absolute value of the inverse quantization level (172) is to be increased in order to obtain a first of the two refined inverse quantization levels (174), wherein fac_m indicates a normalized absolute value by which the normalized absolute value of the inverse quantization level (172) is to be decreased in order to obtain a second of the two refined inverse quantization levels (176), and wherein dz is a normalized width of the dead zone;

wherein the inverse quantization stage (126) is configured to determine two refined inverse quantization levels (174, 176) for a zero quantized value, wherein the inverse quantization stage (126) is configured to obtain the output signal (150) by using one out of the inverse quantization level (172) and two refined inverse quantization levels (174, 176) indicated by quantized residual value;

wherein the inverse quantization stage (126) is configured to determine the two refined inverse quantization levels (174, 176) for the zero quantized value based on the factor:

$$fac\_z = dz/3$$

wherein fac_z indicates a normalized absolute value by which a normalized absolute value of the inverse quantization level (172) is to be increased in order to obtain a first of the two refined inverse quantization levels (174) and a normalized absolute value by which a normalized absolute value of the inverse quantization level (172) is to be decreased in order to obtain a second of the two refined inverse quantization levels (176), and wherein dz is a normalized width of the dead zone;

wherein at least one out of the coded signal parser, the entropy decoder and the inverse quantization stage is implemented by means of a processor or electronic device.

13. Method for encoding, the method comprising:

quantizing an input signal in order to acquire a plurality of quantized values using a dead zone;

encoding the plurality of quantized values using an entropy encoding scheme in order to acquire a plurality of entropy encoded values;

quantizing a residual signal caused by quantizing the input signal, wherein quantizing the residual signal comprises determining, for a non-zero quantized value, at least one quantized residual value and a width of a residual quantization cell in dependence on the dead zone of the quantization stage; and forming a bit stream from the plurality of entropy encoded values and the plurality of quantized residual values;

wherein forming the bitstream comprises appending the at least one quantized residual value or a plurality of quantized residual values to the plurality of entropy encoded values until the coded signal comprises a maximum length available for a transfer to a decoder;

wherein the at least one quantized residual value is not entropy encoded in order to stop the coding whenever the coded signal comprises the maximum length available for the transfer to the decoder;

wherein quantizing the residual signal comprises re-quantize the quantized spectrum line by line, by first, determining the at least one quantized residual value such that the quantized residual value comprises 1 bit for a non-zero quantized value, wherein the residual quantization stage is configured to determine the quantized residual value based on the syntax $$prm[n] = \begin{cases} 0 & \text{if } x[i] < x\_Q[i] \\ 1 & \text{otherwise} \end{cases}$$

wherein prm is a bit stream generated by the residual quantization stage using the quantized residual value, wherein x[i] is the input signal, wherein x_Q[i] is the inverse quantized input signal, wherein n is an index that is incremented by 1 for each non-zero quantized value, and wherein i is an index that is incremented by 1 for each obtained quantized value;

and second, if remaining bits allow, determining the quantized residual value such that the quantized residual value comprises 2 bits for a zero quantized value, wherein the residual quantization stage is configured to determine the quantized residual value (146) based on the syntax $$prm[n] = \begin{cases} 0 & \text{if } |x[i]| < (C \cdot x\_Q[i]) \\ 1 & \text{otherwise} \end{cases}$$

if $prm[n] == 1$ then $$prm[n+1] = \begin{cases} 0 & \text{if } x[i] < 0 \\ 1 & \text{otherwise} \end{cases}$$

wherein C depends on the dead zone of the quantization stage, wherein prm is a bit stream generated by the residual quantization stage using the quantized residual value, wherein x[i] is the input signal, wherein x_Q[i]

is the inverse quantized input signal, wherein n is an index that is incremented by 1 for each zero quantized value that is requantized to a zero quantized value and incremented by 2 for each zero quantized value that is requantized to a non-zero quantized value, and wherein i is an index that is incremented by 1 for each obtained quantized value.

14. Method for decoding, the method comprising:
parsing a coded signal in order to acquire a plurality of entropy encoded values and a quantized residual value;
decoding the plurality of entropy encoded values using an entropy decoding scheme in order to acquire a plurality of quantized values;
inverse quantizing the plurality of quantized values in order to acquire an output signal; and
refining an inverse quantization level used for acquiring the output signal in dependence on a width of a dead zone and the quantized residual value;
wherein refining the inverse quantization level comprises refining an inverse quantization level for a non-zero quantized value in dependence on a quantized residual value and a width of the dead zone;
wherein refining the inverse quantization level comprises refining the inverse quantization level by determining a refined inverse quantization level in dependence on the dead zone;
wherein refining the inverse quantization level comprises determining two refined inverse quantization levels for a non-zero quantized value, wherein the inverse quantization stage is configured to obtain the output signal by using one out of the two refined inverse quantization levels indicated by quantized residual value;
wherein refining the inverse quantization level comprises determining the two refined inverse quantization levels for a non-zero quantized value based on the two factors:

$fac\_p=0.25*dz$ $fac\_m=0.5*(1-0.5*dz)$ wherein fac_p indicates a normalized absolute value by which a normalized absolute value of the inverse quantization level is to be increased in order to obtain a first of the two refined inverse quantization levels, wherein fac_m indicates a normalized absolute value by which the normalized absolute value of the inverse quantization level is to be decreased in order to obtain a second of the two refined inverse quantization levels, and wherein dz is a normalized width of the dead zone;
wherein refining the inverse quantization level comprises determining the two refined inverse quantization levels for a zero quantized value, wherein the inverse quantization stage is configured to obtain the output signal by using one out of the inverse quantization level and two refined inverse quantization levels indicated by quantized residual value;
wherein refining the inverse quantization level comprises determining the two refined inverse quantization levels for the zero quantized value based on the factor:

$fac\_z=dz/3$ wherein fac_z indicates a normalized absolute value by which a normalized absolute value of the inverse quantization level is to be increased in order to obtain a first of the two refined inverse quantization levels and a normalized absolute value by which a normalized absolute value of the inverse quantization level is to be decreased in order to obtain a second of the two refined inverse quantization levels, and wherein dz is a normalized width of the dead zone.

15. A non-transitory digital storage medium having a computer program stored thereon to perform the method for encoding, the method comprising:
quantizing an input signal in order to acquire a plurality of quantized values using a dead zone;
encoding the plurality of quantized values using an entropy encoding scheme in order to acquire a plurality of entropy encoded values;
quantizing a residual signal caused by quantizing the input signal, wherein quantizing the residual signal comprises determining, for a non-zero quantized value, at least one quantized residual value and a width of a residual quantization cell in dependence on the dead zone of the quantization stage; and
forming a bit stream from the plurality of entropy encoded values and the plurality of quantized residual values;
wherein forming the bitstream comprises appending the at least one quantized residual value or a plurality of quantized residual values to the plurality of entropy encoded values until the coded signal comprises a maximum length available for a transfer to a decoder;
wherein the at least one quantized residual value is not entropy encoded in order to stop the coding whenever the coded signal comprises the maximum length available for the transfer to the decoder;
wherein quantizing the residual signal comprises re-quantize the quantized spectrum line by line, by
first, determining the at least one quantized residual value such that the quantized residual value comprises 1 bit for a non-zero quantized value, wherein the residual quantization stage is configured to determine the quantized residual value based on the syntax $$prm[n] = \begin{cases} 0 & \text{if } x[i] < x\_Q[i] \\ 1 & \text{otherwise} \end{cases}$$

wherein prm is a bit stream generated by the residual quantization stage using the quantized residual value, wherein x[i] is the input signal, wherein x_Q[i] is the inverse quantized input signal, wherein n is an index that is incremented by 1 for each non-zero quantized value, and wherein i is an index that is incremented by 1 for each obtained quantized value;
and second, if remaining bits allow, determining the quantized residual value such that the quantized residual value comprises 2 bits for a zero quantized value, wherein the residual quantization stage is configured to determine the quantized residual value (146) based on the syntax $$prm[n] = \begin{cases} 0 & \text{if } |x[i]| < (C \cdot x\_Q[i]) \\ 1 & \text{otherwise} \end{cases}$$

if $prm[n] == 1$ then $$prm[n+1] = \begin{cases} 0 & \text{if } x[i] < 0 \\ 1 & \text{otherwise} \end{cases}$$

wherein C depends on the dead zone of the quantization stage, wherein prm is a bit stream generated by the residual quantization stage using the quantized residual value, wherein x[i] is the input signal, wherein x_Q[i] is the inverse quantized input signal, wherein n is an index that is incremented by 1 for each zero quantized value that is requantized to a zero quantized value and incremented by 2 for each zero quantized value that is requantized to a non-zero quantized value, and wherein i is an index that is incremented by 1 for each obtained quantized value, when said computer program is run by a computer.

16. A non-transitory digital storage medium having a computer program stored thereon to perform the method for decoding, the method comprising:

parsing a coded signal in order to acquire a plurality of entropy encoded values and a quantized residual value;

decoding the plurality of entropy encoded values using an entropy decoding scheme in order to acquire a plurality of quantized values;

inverse quantizing the plurality of quantized values in order to acquire an output signal; and refining an inverse quantization level used for acquiring the output signal in dependence on a width of a dead zone and the quantized residual value;

wherein refining the inverse quantization level comprises refining an inverse quantization level for a non-zero quantized value in dependence on a quantized residual value and a width of the dead zone;

wherein refining the inverse quantization level comprises refining the inverse quantization level by determining a refined inverse quantization level in dependence on the dead zone;

wherein refining the inverse quantization level comprises determining two refined inverse quantization levels for a non-zero quantized value, wherein the inverse quantization stage is configured to obtain the output signal by using one out of the two refined inverse quantization levels indicated by quantized residual value;

wherein refining the inverse quantization level comprises determining the two refined inverse quantization levels for a non-zero quantized value based on the two factors:

$fac\_p = 0.25*dz$ $fac\_m = 0.5*(1-0.5*dz)$ wherein fac_p indicates a normalized absolute value by which a normalized absolute value of the inverse quantization level is to be increased in order to obtain a first of the two refined inverse quantization levels, wherein fac_m indicates a normalized absolute value by which the normalized absolute value of the inverse quantization level is to be decreased in order to obtain a second of the two refined inverse quantization levels, and wherein dz is a normalized width of the dead zone;

wherein refining the inverse quantization level comprises determining the two refined inverse quantization levels for a zero quantized value, wherein the inverse quantization stage is configured to obtain the output signal by using one out of the inverse quantization level and two refined inverse quantization levels indicated by quantized residual value;

wherein refining the inverse quantization level comprises determining the two refined inverse quantization levels for the zero quantized value based on the factor:

$fac\_z = dz/3$ wherein fac_z indicates a normalized absolute value by which a normalized absolute value of the inverse quantization level is to be increased in order to obtain a first of the two refined inverse quantization levels and a normalized absolute value by which a normalized absolute value of the inverse quantization level is to be decreased in order to obtain a second of the two refined inverse quantization levels, and wherein dz is a normalized width of the dead zone, when said computer program is run by a computer.

\* \* \* \* \*